F. W. SANFORD.
TWO BUTTON SWITCH.
APPLICATION FILED OCT. 2, 1905.
900,786.　　　　　　　　　　　　　　Patented Oct. 13, 1908.
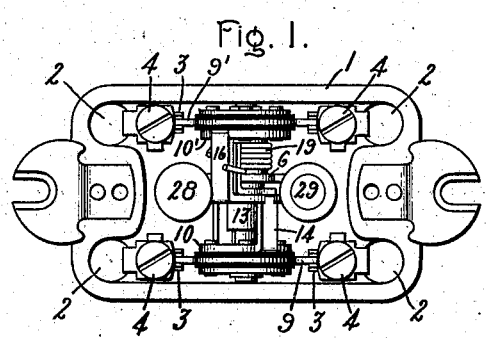
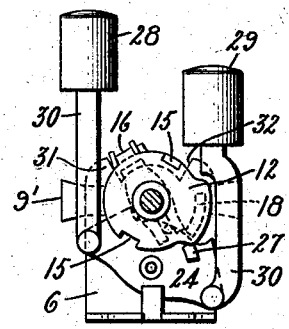
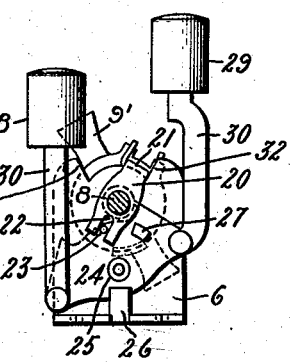
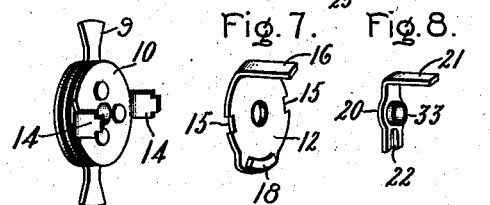
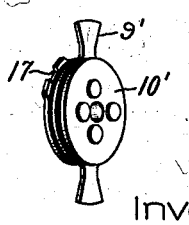
Witnesses.
George H. Tilden.
Benjamin B. Hull
Inventor.
Frank W. Sanford.
by Albert H. Davis
Att'y.

UNITED STATES PATENT OFFICE.

FRANK W. SANFORD, OF SCHENECTADY, NEW YORK, ASSIGNOR TO GENERAL ELECTRIC COMPANY, A CORPORATION OF NEW YORK.

TWO-BUTTON SWITCH.

No. 900,786.      Specification of Letters Patent.      Patented Oct. 13, 1908.

Application filed October 2, 1905. Serial No. 280,881.

*To all whom it may concern:*

Be it known that I, FRANK W. SANFORD, a citizen of the United States, residing at Schenectady, county of Schenectady, State of New York, have invented certain new and useful Improvements in Two-Button Switches, of which the following is a specification.

This invention relates to electric switches of the two-button snap type, and its object is to simplify and improve the operating mechanism so that nearly all the parts can be punched from sheet metal by disks and assembled without further finishing.

The switch comprises an arbor on which are loosely pivoted one or two insulated contact-blades, a coiled spring concentric with said arbor, an escape-plate pivoted on said arbor and rigidly connected with the contact-blades, an arm on said plate passing between the ends of said spring, a spring-stretcher pivoted on said arbor and having an arm passing between the ends of said spring, a tilting locking-plate having a lug, a pallet coöperating with an escapement-lug on the escape-plate, and a pin engaging with a fork on the spring-stretcher, two push-buttons pivotally connected with the locking-plate, and the usual inclosing and supporting casing, contact-clips, and other parts.

In the accompanying drawing, Figure 1 is a plan view of a switch embodying my invention, the face-plate having been removed; Fig. 2 is a cross-section of the same through the arbor; Fig. 3 is a sectional elevation of the working parts, on the line 3 3, Fig. 2; Fig. 4 is a similar section, on the line 4 4, Fig. 2; Fig. 5 is a similar section on the line 5 5, Fig. 2; Fig. 6 is a perspective view of one contact-blade; Fig. 7 shows the escape-plate; Fig. 8 the spring-stretcher; and Fig. 9 the other contact-blade.

The box or casing 1 is made of porcelain or other insulating material and has a hole 2 in each corner for the admission of the line wires. Adjacent to each hole is a contact-clip 3 provided with a binding-screw 4. In the bottom of the casing is a shallow recess to receive the foot 5 of the frame 6, which is preferably made of sheet metal. A cylindrical boss 7 projects from one side of the frame near its top, and through this boss passes an arbor 8 at right angles to said frame and transverse to the casing 1. On each end of the arbor is loosely mounted a double-ended contact-blade 9 9', which is insulated from the arbor and from the two clamping disks 10 10' held together by rivets 11 11'. Arms extend between the inner disk on each blade to an escape-plate 12 having a hub 13 journaled on the arbor. The preferred construction is that shown, in which the blade 9 has two arms 14 extending from its inner disk 10 parallel with the arbor, their ends engaging with notches 15 in the edge of the escape-plate; while the other blade 9' is connected with said plate by an arm 16 integral with the plate and extending parallel with the arbor to engage with a notch 17 in the inner disk 10' of said blade 9'. The two blades and the escape-plate are thus rigidly locked together, so that they turn as one piece on the arbor. The escape-plate also has an escapement lug 18 projecting in the same direction as the arm 16, but on the opposite side of the arbor.

A helical spring 19 encircles the boss 7 and its ends project radially on each side of the arm 16. A spring-stretcher 20 is pivoted on the arbor adjacent to the escape-plate, and has an arm 21 extending parallel with the arbor underneath the arm 16 and between the ends of the spring 19, but terminating just short of the disk 10'. The lower end of the spring-stretcher has a fork 22 to engage with a pin 23 on a tilting locking-plate 24, which is pivoted on a trunnion 25 projecting from the frame. A lip 26 is turned up from the foot 5 of said frame to prevent the locking-plate from slipping off the trunnion. A pallet-lug 27 projects from the face of the locking-plate and coöperates with the escapement-lug 18 on the escape-plate. Two push-buttons 28 29 have stems 30 which are pivotally attached to the ends of the locking-plate.

The operation is as follows: Let the parts stand as shown in Figs. 1, 2 and 3. The button 29 is "in"; the contact-blades are closed on the clips; the arms 16 and 21 of the escape-plate and the spring-stretcher lie superposed between the ends of the spring and against the left-hand stop-shoulder 31 of the frame 6. Now if one pushes downward on the button 28, the locking-plate is tilted and its pin 23 turns the spring-stretcher, causing its arm 21 to move over to the right, carrying before it one end of the spring, the other end of which rests against the arm 16 of the escape-plate. Just as the locking-plate begins to tilt, its pallet-lug 27 is carried up opposite the end of the escapement-lug 18 on the escape-plate, so that the latter is held locked in spite of the pressure of the spring against its arm 16. The lugs are of such a size as to maintain this locking effect until the spring-stretcher arm has moved nearly over to the stop-shoulder 32 of the frame; the position shown in Fig. 4. The next instant the pallet-lug clears the end of the escapement-lug 18, and the spring, which has been put under tension by this separation of its ends, throws the arm 16 over against the stop-shoulder 32, in line with the spring-stretcher arm 21; the position shown in Fig. 5. This movement of the escape-plate opens the switch. The closing movement is the reverse of this; the pallet-lug locking the escape-plate until the spring-stretcher has almost reached the stop-shoulder 31 and then releasing it when the spring is under its greatest tension.

One merit of the present invention is the fact that the disks 10 10', the escape-plate 12, the spring-stretcher 20, the locking-plate 24, the frame 6 and the stems 30 of the buttons are all sheet-metal punchings. The lugs 18 and 27, the pin 23, the trunnion 25 and the hub 33 of the spring-stretcher are all accurately formed by dies, and very little labor is required to assemble the parts.

The switch shown and described is a double-pole switch, but it is evident that by omitting one contact-blade the same mechanism would operate equally well as a single-pole switch.

What I claim as new and desire to secure by Letters Patent of the United States, is,—

1. In a two-button snap switch, the combination with a contact-blade, of an escape-plate rigidly connected therewith and having an escapement-lug, a spring for actuating said plate, a spring-stretcher, a tilting locking-plate connected by a pin and slot with the spring-stretcher and having a pallet-lug coöperating with the escapement-lug, and buttons connected with said locking-plate.

2. In a two-button snap switch, the combination with a contact-blade, of an escape-plate rigidly connected therewith and having an escapement-lug and an arm, a spring having its ends standing on opposite sides of said arm, a pivoted spring-stretcher having an arm lying between the ends of said spring, a tilting locking-plate connected by a pin and slot with said spring-stretcher and having a pallet-lug adapted to pass across the ends of said escapement-lug, and buttons pivotally connected with said locking-plate.

3. In a snap switch, the combination with the tilting lever, of a frame plate having a trunnion on which said lever is fulcrumed, and a lip bent up from said plate and overlying said lever to prevent its disengagement from said trunnion.

4. In a two-button snap switch, the combination with an arbor, of two insulated contact-blades journaled thereon, an escape-plate also journaled on said arbor between said blades and rigidly connected therewith, a spring concentric with said arbor, a forked spring-stretcher journaled on said arbor, arms on the escape-plate and spring stretcher engaging with said spring, a locking-plate pivoted adjacent to said arbor, a pin on said plate engaging the fork of the spring-stretcher, and coöperating lugs on said escape-plate and locking-plate.

In witness whereof, I have hereunto set my hand this 30th day of September, 1905.

FRANK W. SANFORD.

Witnesses:
BENJAMIN B. HULL,
MARGARET E. WOOLLEY.